United States Patent

[11] 3,603,419

| [72] | Inventor | Kenyon L. Riddle<br>3789 Hillside Lane, Salt Lake City, Utah 84109 |
|---|---|---|
| [21] | Appl. No. | 841,911 |
| [22] | Filed | July 15, 1969 |
| [45] | Patented | Sept. 7, 1971 |

[54] COMBINATION COVER AND TRAILING SLEIGH FOR TRACTION SNOW VEHICLES
6 Claims, 7 Drawing Figs.

[52] U.S. Cl. .................................................. 180/5 R, 280/18, 280/24, 296/136
[51] Int. Cl. .................................................. B62m 27/02
[50] Field of Search ............................................. 180/5; 280/24; 296/23, 23 B; 114/63, 43; 9/1 TR

[56] References Cited
UNITED STATES PATENTS

| 861,607 | 7/1907 | Pfeifer | 114/43 |
| 1,408,270 | 2/1922 | Christiansen | 114/63 |
| 1,455,994 | 5/1923 | Cowan | 296/23 (B) |
| 2,196,458 | 4/1940 | Flynn et al | 180/5 |
| De.155,902 | 11/1949 | Keating | 296/23 |

*Primary Examiner*—Leo Friaglia
*Assistant Examiner*—Robert R. Song
*Attorney*—David V. Trask ABSTRACT: A combination cover and trailing sleigh including runner means attached to a hollow, structurally rigid hull element. The hull element is adapted to receive the upper portion of a traction snow vehicle in its interior through an opening so that it may be placed atop the vehicle as a cover. One or more runners are attached to the outside surface of the hull element opposite the opening so that the hull element may be towed by the vehicle as a sleigh.

PATENTED SEP 7 1971

INVENTOR.
KENYON L. RIDDLE

BY David V. Trask

ATTORNEY

INVENTOR.
KENYON L. RIDDLE
BY David V. Trask
ATTORNEY

3,603,419

COMBINATION COVER AND TRAILING SLEIGH FOR TRACTION SNOW VEHICLES

BACKGROUND OF THE INVENTION

1. Field

This invention relates to accessories for traction snow vehicles, particularly those of the snowmobile variety. It specifically provides a combination rigid cover and trailing sleigh for such vehicles.

2. State of the Art

Traction snow vehicles have come into wide use for recreational and maintenance purposes. Such vehicles convey persons and other loads across snow and provide access to wilderness areas, or other remote locations, which have no suitable access roads during the wintertime. These vehicles permit regular maintenance of otherwise inaccessible weather stations or utility equipment. Moreover, they (particularly smaller vehicles adapted for carrying one or two persons) have become very popular for recreational entertainment.

Available snowmobiles (and similar traction snow vehicles) are open-topped and require protective covering when they are stored out of doors or transported between locations on open trailers. They are usually covered with tarpaulins of various types. Even when such covers are shaped to fit the vehicle, they provide limited protection against abrasion and are themselves subject to damage by abrasion or by flapping by the wind.

Another inconvenience of snowmobiles is their limited capacity. Accordingly, it has become the practice to tow various types of toboggans, sleighs, or cutters behind snow vehicles to carry additional passengers or other loads. Of course, if such trailing conveyances are used, provision must be made for their transport to and from the location at which they are to be used. It is generally inconvenient to transport the number of snowmobiles and trailing sleighs desired, because of the limited capacities of trucks and trailers available for that purpose.

SUMMARY OF THE INVENTION

The present invention provides a combination cover and trailing sleigh which overcomes many of the inconveniences of the prior art. Thus, the combination of the present invention provides both a rigid cover for the snowmobiles and a trailing sleigh of substantial capacity compared to those heretofore available for use with snowmobiles. The normal position of the combination of this invention when the traction snow vehicle is being stored or transported from one location to another is nested on top of the snow vehicle as a cover. It thus offers the advantage of a trailing sleigh without imposing any additional space requirement for haulage purposes.

The combination cover and trailing sleigh of the present invention is formed generally as a hollow hull with an opening adapted to receive the upper portion of the snow vehicle with which it is intended for use. Generally, the hull element will be entirely open and will be proportioned such that, when the combination is placed atop the snow vehicle as a cover, it will protect all of the exposed interior portions of the snow vehicle from sun or precipitation. It will usually nest over and enclose substantially the entire top portion of the vehicle, including the passenger and engine compartments. Unlike many of the fabric covers of the prior art, when the combination of this invention is used as a cover, it permits good air circulation through the passenger compartment. This circulation is desirable for many of the materials of construction of seats and upholstery, particularly in hot storage areas.

The hull may carry means for securing it to a snowmobile as a cover. Suitable means include an appropriate lip portion or slots along the perimeter of the opening for lashing, or otherwise fastening, to anchoring points on the snowmobile. Although usually at least a portion of the fastening means will be carried by the hull element itself, it is within contemplation that fastening means, operably associated with the hull element but either separate or carried by the snowmobile, may be employed. In that event, the hull element itself may be regarded as fastening means because its structural features coact with such other means to provide securement of the hull to the snow vehicle.

Runner means are attached to the outside surface of the hull element opposite the aforesaid opening. They are arranged longitudinally of the hull element such that the hull may be inverted from its covering position and placed on the snow atop said runner means to function as a sleigh-type conveyance. The runner means may be formed as a single, wide, toboggan-like surface, comprising the underside of the combination, in its trailing-sleigh mode of operation. It is normally preferred, however, that the runner means comprise two, spaced skilike runners. Such runners desirably extend approximately the full length of the combination longitudinally of the hull and approximately parallel to each other; they should be spaced sufficiently to provide good stability for the sleigh.

According to some embodiments, the runner means are attached to the hull element by spacers such that the passenger compartment provided by the hollow interior of the hull is held up off the surface of the snow. The spacers may be rigid or they may include spring members to absorb shock from uneven running surfaces. Usually, however, the runner means are integral with the bottom of the sleigh. For example, the cover-sleigh may be of fiber glass-reinforced resin or other moldable material, and the runner means may be molded directly into the bottom of the sleigh as a part of the surface of the hull element.

Suitable means are carried by the hull element for attaching the sleigh in trailing relationship to the back of the snow vehicle. Although any convenient connecting means may be employed, a conventional, two-part trailer hitch coupling with one part attached to the rear of the snow vehicle and the other part rigidly connected to the front of the trailing sleigh is usually most convenient.

The combination of this invention may take variety of forms and shapes, provided it is compatible in size and shape with the snow vehicle with which it is intended for use. Some embodiments of the invention, when inverted from their position of use as a sleigh for use as a cover, are oriented such that the front of the sleigh faces toward the front of the snow vehicle. In other instances, the orientation of the combination in its cover mode places the front of the sleigh towards the rear of the snow vehicle. The coupling means connecting the sleigh to the rear of the snow vehicle may then comprise a portion of the aforementioned fastening means for holding the cover in place. According to such embodiments, the trailing sleigh need merely be provided on the coupling to cover the snowmobile, thereby avoiding the necessity for connecting and disconnecting the sleigh as well as for separately positioning the cover over the vehicle.

DESCRIPTION OF THE DRAWINGS

The invention will be better understood with reference to the drawings, which illustrate what is presently regarded as the best mode for carrying out the invention. In the drawings.

DESCRIPTION OF THE ILLUSTRATED EMBODIMENTS

Figure 1:
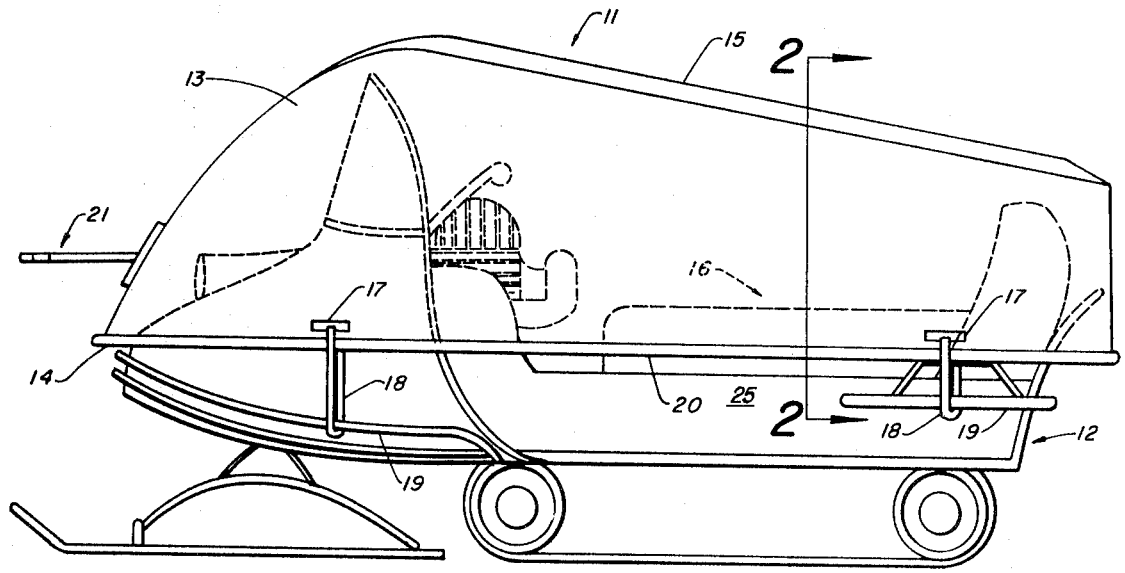
FIG. 1 is a view in side elevation of one embodiment of the invention mounted atop a snowmobile (shown partially in phantom lines) as a cover therefore.
Figure 2:
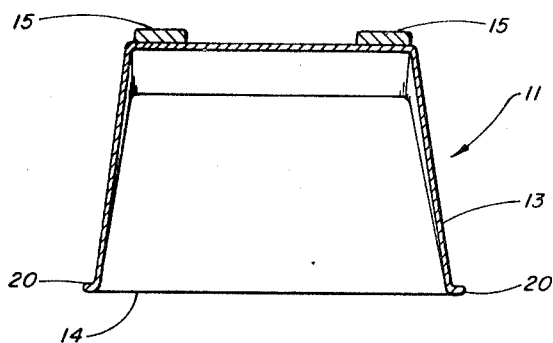
FIG. 2, a view in cross section taken from the standpoint of line 2—2 of FIG. 1.

FIGS. through 3 illustrate an embodiment 11 of the invention which provides a cover (FIG. 1) for substantially an entire snowmobile 12. This embodiment 11 includes a hull element 13 with an access opening 14 into its interior and a pair of ski runners 15 attached to its outer surface directly opposite the opening 14.

Figure 3:
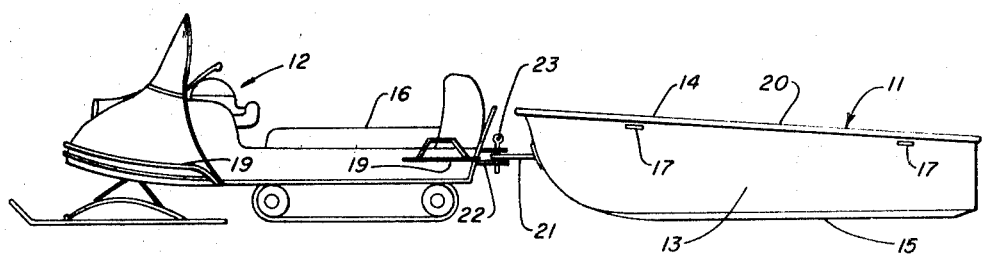
FIG. 3, a view in side elevation of the embodiment of FIG. 1 attached to a snowmobile as a trailing sleigh.

The access opening 14 is coextensive with the largest horizontal cross section of the hull 13. Thus, whether the hull 13 is oriented for use as a cover (FIG. 1) or a trailing sleigh (FIG. 3), entry into its interior is unrestricted. The interior of the hull 13 is conformed to accommodate the top portion of the snowmobile 12 so that it shields the normally exposed, interior portions 16 thereof when the combination is used as a cover. The interior of the hull 13 is also shaped appropriately to accommodate a load when the combination is used as a trailing sleigh.

The hull 13 may be of reinforced resin construction; e.g., fiber glass-reinforced polyester resin, and the runners 15 may be molded or cast as an integral portion of the hull surface.

As illustrated, slots 17 are provided in the hull 13 near the perimeter of its access opening 14. Straps 18, or other suitable ties, may be inserted through these slots and around guard rails 19 carried by the snowmobile to secure the cover (hull 13) in place. The portion 210 of the hull 13 which defines the access opening 14 is formed as a lip, or ridge, to enhance the appearance of, and to lend strength to, the hull 13. This lip 20 may be adapted in various ways to be clamped to the snowmobile, if desired.

If desired, side flaps (not shown) of fabric or rigid material may be connected at the periphery of the access opening 14; e.g., along the lip 20. Such flaps may be fastened to cover the exposed region 25 when the hull 13 is used as a cover. The same flaps may be used to cover the interior of the hull 13 or its contents when it is used as a sleigh. In some instances, such flaps are desirable because the hull element 13 may have less depth than is illustrated.

A towing yoke 21 extends from attachment to the front of the hull element 13 and is adapted for hitching to an appropriate connecting member 22 carried at the back of the snowmobile 12. In the illustrated instance, (FIG. 3) pin 23 is inserted through holes in the yoke 21 and connecting member 22 to provide a loose pivot connection. Thus, the trailing sleigh 11 is free to move with respect to the snowmobile 12 in conventional fashion to accommodate normal turns and uneven terrain.

Figure 4:
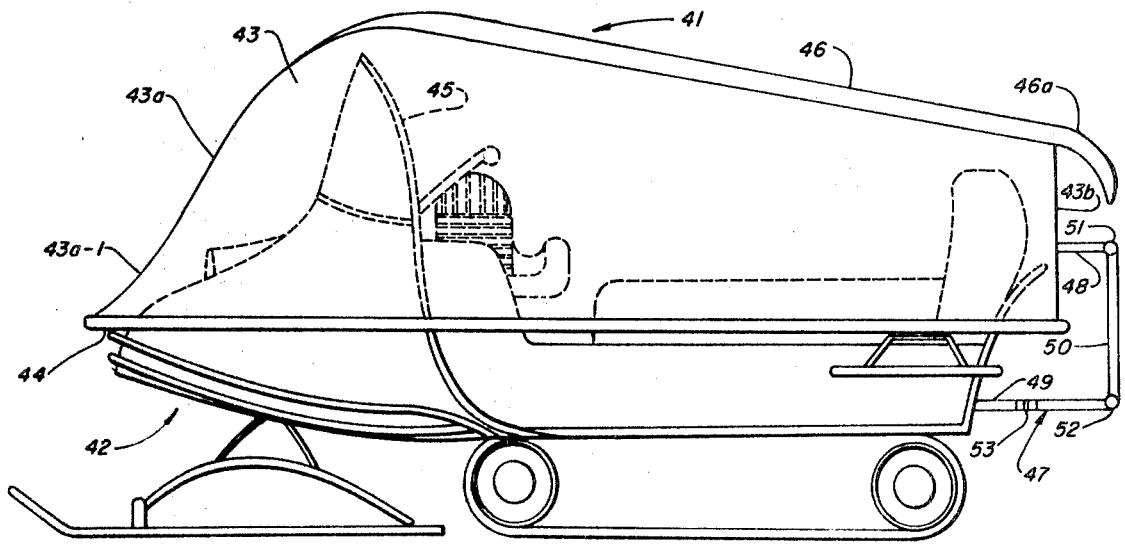
FIG. 4, a view similar to FIG. 1 of an alternative embodiment.

FIG. 4 illustrates an embodiment 41 of the invention wherein the snow vehicle 42 is permanently connected to the hull element 43. The access opening 44 permits entry of substantially the entire top portion of the snow vehicle 42 with the back 43a of the sleigh (hull 43) covering the front of the snow vehicle.

The back 43a of the hull 43 is shaped to provide a comfortable backrest for passengers when the combination 41 is used as a sleigh. The portion 43a—1 of the back 43a of the hull 43 is adapted to rest on the top of the snow vehicle 12 to hold the hull out of contact with the windshield 45 of the snow vehicle 12. Certain snowmobiles may be provided with removable windshields 45, in which case, the hull element 43 could be adapted to rest further down over the snowmobile 42 than is illustrated.

A pair of runners 46 (a tobogganlike running surface could be used instead of individual ski-type runners) is attached to the hull 41 opposite the access opening 44, as shown. A portion 46a of each runner extends beyond the front 43b of the hull 43 (in its sleigh mode). These portions 46a are curved as shown to provide good leading surface for snow travel.

The front 43b of the hull element 43 is attached to the rear of the snow vehicle 42 by means of a double-pivoting towing bar arrangement 47. This arrangement 47 includes a rigid yoke (or pole) 48 carried by the front 43b of the hull element 43, a corresponding hitching bar 49 carried by the back of the snow vehicle 42, and a connecting rod 50 joining the distal ends of the yoke 48 and bar 49 by pivot connections 51 and 52, respectively. Thus, the hull element 41 may be swung up into place as a cover (as illustrated) or down onto the snow as a trailing sleigh without connecting or disconnecting procedures. Locking means (not shown) may be provided in association with either or both pivot connections 51, 52 to hold the hull 43 in place as a cover. The hitching bar 49 includes a coupling 53 to permit lateral pivoting.

Figure 5:
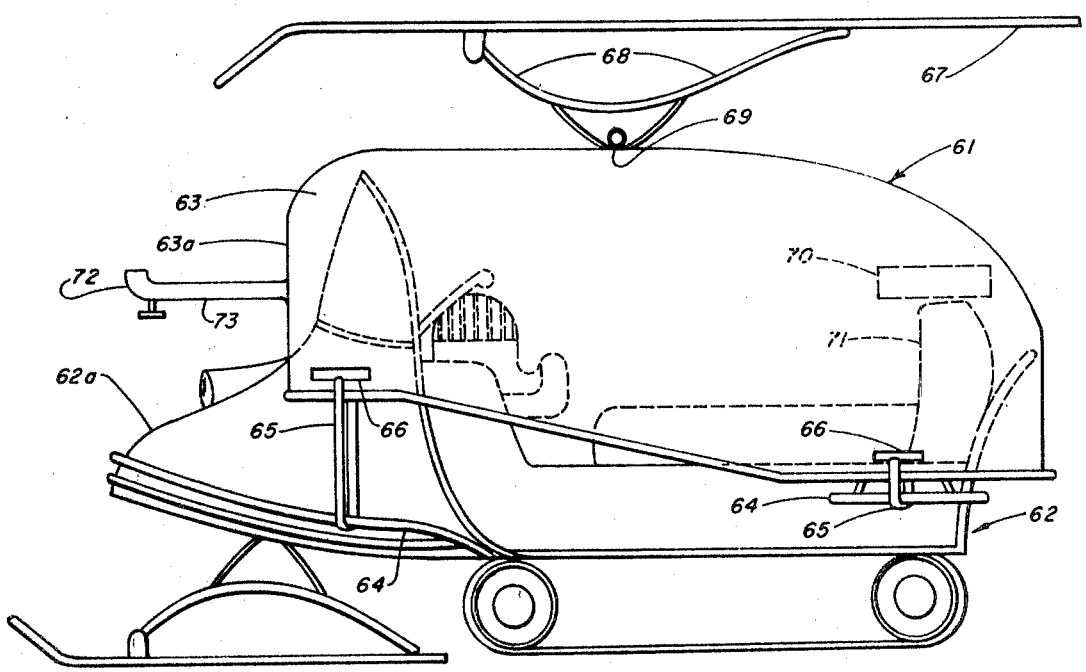
FIG. 5, a similar view of still another embodiment of the invention.
Figure 6:
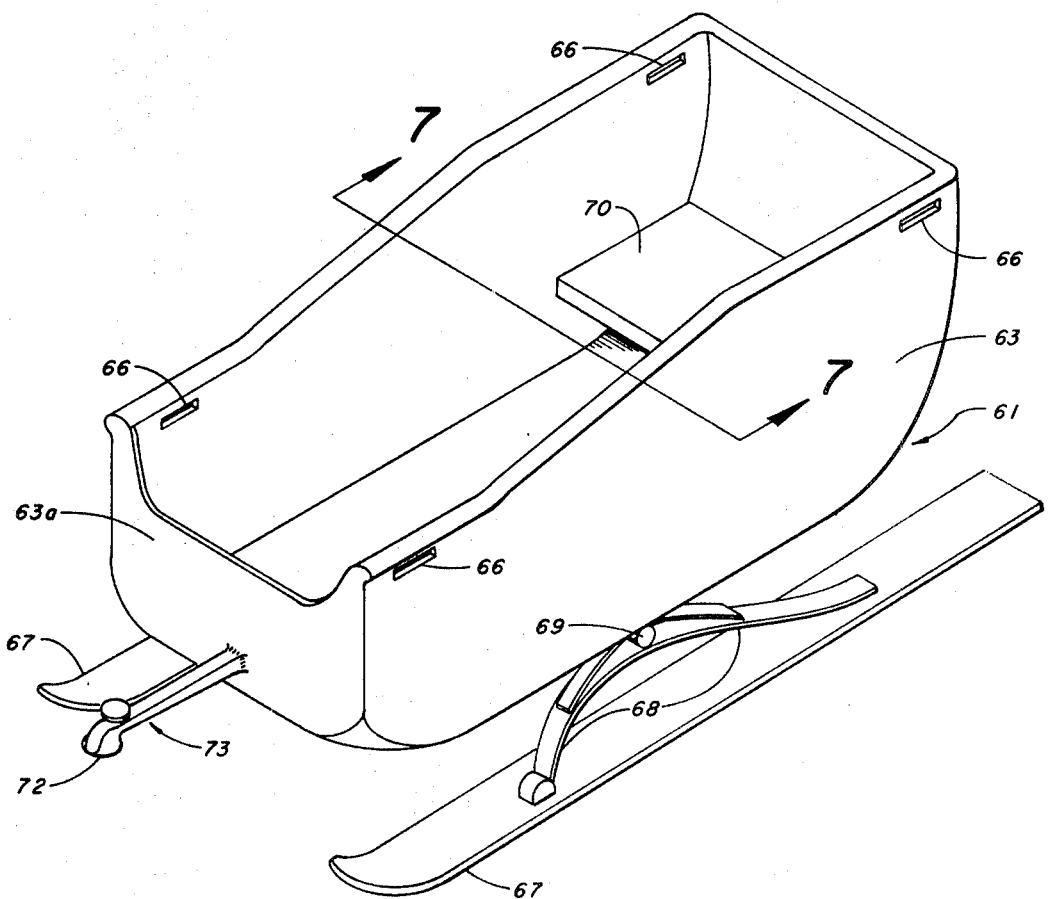
FIG. 6, a pictorial view of the embodiment of FIG. 5.
Figure 7:
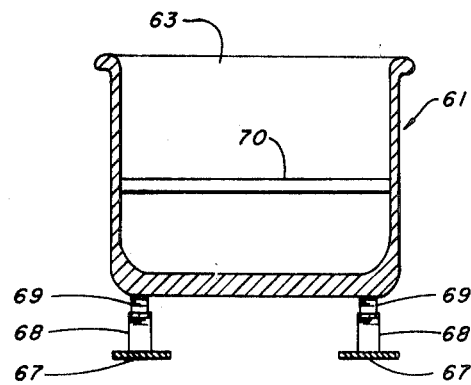
FIG. 7, a view in cross section from the standpoint of the line 7—7 of FIG. 6.

The embodiment 61 of FIGS. 5, 6, and 7 is illustrate of the diversity of designs possible for the claimed combination. The normally exposed interior portions of a snow vehicle 62 are covered by the hull 63 when the combination 61 illustrated is placed over the vehicle 62 as a cover (FIG. 5); however, the front portion 62a of the vehicle 62 is left exposed. FIGS. 6 and 7 illustrate the manner in which the front 63a of the sleigh (hull 63) may be conformed to fit around the front 62a of the vehicle 62. The hull 63 may be attached to guards 64 carried by the vehicle 62 by straps 65 passed through slots 66 in the hull 63.

Ski runners 67 are connected to the hull element 63 by spring members 68 and suitable anchoring means 69. A seat 70 may be provided inside the hull element 63 as shown, but it should be located such that it does not interfere with use of the combination 61 as a cover. The sleigh seat 70 map be located to rest atop the back 71 of the passenger seat of the vehicle 62 (FIG. 5) to hold the hull element 63 in proper position for fastening. A conventional trailer hitch coupling 72 is attached to the front 63a of the hull element 63 by a rigid pole 73.

Each of the embodiments illustrated provides protection from sun, wind, and weather for a snow vehicle, both when it is stored and when it is hauled in or by a fast-moving vehicle. Good air circulation through the passenger compartment (and in appropriate instances the motor compartment) of the snow vehicle is assured because the rigid construction of the hull element obviates the necessity, characteristic of flexible covers, for tightly containing (wrapping) the vehicle. The combination of a snow vehicle with a combination cover and trailing sleigh represents an important advance in the art. The combination cover and trailing sleigh represented by the various embodiments specifically disclosed herein is itself novel in that its dimensional and structural requirements differ from trailing sleighs of the prior art. Thus, although a single claimed combination may be used interchangeably with more than one model or type of snow vehicle, it must be specifically shaped and dimensioned to accommodate the upper portion of a snowmobile (including the normally exposed passenger compartment) in one mode of use and to accommodate a load (such as one or more passengers) in its other mode of use.

I claim;

1. A combination cover and trailing sleigh for snow vehicles comprising:
    a hollow, structurally rigid hull element with an access opening adapted to receive the upper portion of a snow vehicle when the hull is placed atop the snow vehicle as a cover therefor;
    runner means attached to the outside surface of said hull element opposite said opening, extending longitudinally along said surface so that the hull element may be placed on said runner means to functions as a conveyance for moving over snow;
    slots carried by the hull element for attaching it to a snow vehicle when it is placed atop the snowmobile as a cover; and
    means carried by said hull element for connecting said hull in trailing relationship to the back of said snowmobile.

2. A combination according to claim 1, wherein the access opening into the hull element is coextensive with the largest horizontal cross section of said hull element and the interior of the hull element is shaped and dimensioned to receive substantially the entire top portion of the snow vehicle.

3. A combination according to claim 2, wherein the runner means are integral with the outer surface of the hull element.

4. In combination:
a snow vehicle adapted to travel across snow and having a normally exposed, open passenger compartment; and
a combination cover and trailing sleigh comprising:
   a hollow, structurally rigid hull element with an access opening adapted to permit entry of the top portion of said snow vehicle into its interior, said interior being shaped and dimensioned to accommodate said passenger compartment substantially therein;
   runner means attached to said hull element opposite said access opening; and
   means carried by said hull element and said snow vehicle for connecting said hull element to trail said vehicle as a trailing sleigh.

5. A combination according to claim 4, including means carried by said hull element for securing it as a cover atop said vehicle.

6. A combination according to claim 4, wherein the combination cover and trailing sleigh includes sides flaps extending from the periphery of said access opening adapted for covering exposed regions of the snow vehicle when the combination is used as a cover and to cover the interior of the hull element when the combination is used as a sleigh.

PO-1050
(5-69)

UNITED STATES PATENT OFFICE
CERTIFICATE OF CORRECTION

Patent No. 3,603,419      Dated September 7, 1971

Inventor(s) Kenyon L. Riddle

It is certified that error appears in the above-identified patent and that said Letters Patent are hereby corrected as shown below:

Col. 2, line 37, after "take" insert --a--;

line 49, change "provided" to --pivoted--;

Col. 3, line 2, after "FIGS." insert --1--;

line 71, after "provide" insert --a--;

Col. 4, line 11, change "illustrate" to --illustrative--;

line 26, change "map" to --may--;

Claim 1, line 13, change "snowmobile" to --snow vehicle--;

line 15, before "means" insert --hitching--;

line 16, change "snowmobile" to --snow vehicle--.

Signed and sealed this 11th day of April 1972.

(SEAL)
Attest:

EDWARD M. FLETCHER, JR.
Attesting Officer

ROBERT GOTTSCHALK
Commissioner of Patents